US011182065B2

(12) United States Patent
Sun

(10) Patent No.: US 11,182,065 B2
(45) Date of Patent: Nov. 23, 2021

(54) METHOD AND APPARATUS FOR PUSHING INFORMATION

(71) Applicant: Advanced New Technologies Co., Ltd., Grand Cayman (KY)

(72) Inventor: Renen Sun, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/378,213

(22) Filed: Apr. 8, 2019

(65) Prior Publication Data

US 2019/0235723 A1    Aug. 1, 2019

Related U.S. Application Data

(63) Continuation of application No. PCT/CN2017/107497, filed on Oct. 24, 2017.

(30) Foreign Application Priority Data

Nov. 7, 2016  (CN) .......................... 201610978785.9

(51) Int. Cl.
*G06F 3/0488* (2013.01)
*G06F 11/34* (2006.01)
(Continued)

(52) U.S. Cl.
CPC .......... *G06F 3/0488* (2013.01); *G06F 3/0485* (2013.01); *G06F 11/3438* (2013.01); *G06Q 30/0255* (2013.01)

(58) Field of Classification Search
CPC .. G06F 3/0488; G06F 3/0485; G06F 11/3438; G06F 11/34–3495;
(Continued)

(56) References Cited

U.S. PATENT DOCUMENTS 5,717,860 A * 2/1998 Graber ............... G06Q 30/0277
709/227
5,999,912 A * 12/1999 Wodarz ................. G06Q 30/02
705/14.61
(Continued)

FOREIGN PATENT DOCUMENTS

CN    102446222    5/2012
CN    103440276    12/2013
(Continued)

OTHER PUBLICATIONS

International Search Report and Written Opinion in International Application No. PCT/CN2017/107497, dated Dec. 5, 2017, 12 pages (with English translation).
(Continued)

*Primary Examiner* — David S Posigian
(74) *Attorney, Agent, or Firm* — Fish & Richardson P.C.

(57) ABSTRACT

This specification techniques for targeted information display based on historical user behavior. One example method include receiving an information acquisition request sent by a client, wherein the information acquisition request comprises an identifier of a source display location and an identifier of a user that requests to obtain information; identifying a display location trajectory diagram that corresponds to the user identifier, wherein an order in which the user historically browses display locations is recorded in the display location trajectory diagram; identifying a target display location based on the display location trajectory diagram, the target display location adjacent to the source display location and after the source display location, wherein the target display location is a predicted location that is most likely to be browsed by the user; and transmitting the information to the client that corresponds to the user identifier for display in the target display location.

18 Claims, 10 Drawing Sheets

(51) Int. Cl.
*G06F 3/0485* (2013.01)
*G06Q 30/02* (2012.01)

(58) Field of Classification Search
CPC ....... G06F 16/172; G06F 16/957–9574; G06F 12/0862; G06F 2212/602; G06F 2212/6022; G06F 2212/6024; G06F 2212/6026; G06F 2212/6028; G06F 9/30047; G06F 9/3802–3822; G06F 9/383–3832; H04L 67/16; H04L 67/22; H04L 67/26; H04L 67/2847; H04L 67/306; Y02D 50/10; G06Q 30/0241–0277
See application file for complete search history.

(56) References Cited

U.S. PATENT DOCUMENTS

| | | | | |
|---|---|---|---|---|
| 8,271,328 | B1 | 9/2012 | Baltz et al. | |
| 9,552,439 | B1* | 1/2017 | Krecichwost | G06F 3/0482 |
| 2003/0126013 | A1* | 7/2003 | Shand | G06Q 30/02 |
| | | | | 705/14.52 |
| 2003/0149937 | A1* | 8/2003 | McElfresh | G06Q 30/02 |
| | | | | 715/210 |
| 2003/0187984 | A1* | 10/2003 | Banavar | H04L 29/06 |
| | | | | 709/225 |
| 2008/0133314 | A1 | 6/2008 | Chiu | |
| 2009/0222737 | A1* | 9/2009 | Liesche | H04L 67/22 |
| | | | | 715/738 |
| 2009/0249229 | A1* | 10/2009 | Offer | G06Q 30/02 |
| | | | | 715/760 |
| 2012/0284597 | A1* | 11/2012 | Burkard | G06F 17/2235 |
| | | | | 715/205 |
| 2013/0091270 | A1* | 4/2013 | Zhang | H04L 41/22 |
| | | | | 709/224 |
| 2013/0212487 | A1* | 8/2013 | Cote | G06F 9/451 |
| | | | | 715/745 |
| 2014/0207748 | A1 | 7/2014 | Sood et al. | |
| 2014/0372230 | A1* | 12/2014 | Ray | G06Q 30/0242 |
| | | | | 705/14.71 |
| 2014/0379835 | A1* | 12/2014 | Foerster | H04L 67/2847 |
| | | | | 709/213 |
| 2015/0201001 | A1* | 7/2015 | Cabanillas | G06Q 50/01 |
| | | | | 709/203 |
| 2015/0261770 | A1* | 9/2015 | Chen | G06F 17/2247 |
| | | | | 715/234 |
| 2017/0017364 | A1* | 1/2017 | Kekki | G06F 16/9574 |
| 2017/0212651 | A1* | 7/2017 | Courvoisier | G06F 8/38 |

FOREIGN PATENT DOCUMENTS

| | | |
|---|---|---|
| CN | 103853729 | 6/2014 |
| CN | 104991898 | 7/2014 |
| CN | 104182515 | 12/2014 |
| CN | 104572942 | 4/2015 |
| CN | 104883585 | 9/2015 |
| CN | 105302879 | 2/2016 |
| CN | 105404639 | 3/2016 |
| CN | 105844499 | 8/2016 |
| CN | 106020784 | 10/2016 |
| CN | 108139861 | 6/2018 |
| JP | 2008097453 | 4/2008 |
| TW | 201638847 | 11/2016 |
| WO | WO 2011002209 | 1/2011 |
| WO | WO 2012002209 | 1/2012 |
| WO | WO 2015127884 | 9/2015 |

OTHER PUBLICATIONS

International Preliminary Report on Patentability in International Application No. PCT/CN2017/107497, dated May 7, 2019, 8 pages (with English Translation).
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
Extended European Search Report in European application No. 17868227.4, dated Sep. 16, 2019, 10 pages.

* cited by examiner

METHOD AND APPARATUS FOR PUSHING INFORMATION

CROSS-REFERENCE TO RELATED APPLICATIONS

This application is a continuation of PCT Application No. PCT/CN2017/107497, filed on Oct. 24, 2017, which claims priority to Chinese Patent Application No. 201610978785.9, filed on Nov. 7, 2016, and each application is hereby incorporated by reference in its entirety.

TECHNICAL FIELD

The present application relates to the field of Internet technologies, and in particular, to an information pushing method and apparatus.

BACKGROUND

With continuous development of the Internet, information dissemination becomes increasingly more convenient and rapid. Users can conveniently use a client to browse information.

The client can be an application (APP) on software, for example, an electronic wallet APP, an instant messaging APP, or a news APP.

Generally, information can be displayed in a display location in the client. Usually, an arrangement order of display locations on the client is fixed. Orders of display locations that are displayed in different clients are also the same. The difference lies only in that the numbers of display locations that can be simultaneously displayed are different because screen sizes of different clients are different. For example, a client shown in FIG. 1 can simultaneously display three display locations, while another client with a relatively small screen can simultaneously display two display locations. However, display locations 1, 2, 3, 4, 5, etc. are fixedly and sequentially displayed in an arrangement order of the display locations. In addition, when obtaining information, the client sequentially obtains information in display location 1, information in display location 2, information in display location 3, etc.

Still as shown in FIG. 1, display locations that are displayed currently are 1, 2, and 3, and corresponding information is displayed. For a display location that is not displayed (for example, display locations 4 and 5), the client obtains information from a server only when the display location is displayed. Because it needs to take time to obtain information, this information acquisition method may cause stalling and affect user experience.

In the existing technology, a pre-acquisition method is usually used to alleviate the previous problem. When a user is browsing information in a current page, a client pre-obtains information in a next display location. Still as shown in FIG. 1, information in display locations 1, 2, and 3 is displayed in the current page, and the client obtains, from the server, information in next display location 4 that is not displayed. In this case, when browsing display location 4, the user can directly use the pre-obtained information, to prevent stalling caused by a factor such as a communication delay from affecting user experience. However, when browsing information, the user does not necessarily sequentially browse the information in the display locations. Continuing to refer to FIG. 1, assume that when the user flicks the display locations quickly on a screen or a flick amplitude is relatively large, display location 4 and display location 5 flash by, and information in display locations 6, 7, and 8 is displayed finally. In this case, based on the existing technology, the client sequentially obtains the information in display locations 4, 5, 6, 7, and 8 from the server. However, the user actually does not browse the information in display locations 4 and 5 because the information flashes by. Consequently, it becomes meaningless for the server to push the information in display locations 4 and 5, and system resources are wasted.

SUMMARY

The present application provides an information pushing method and apparatus, to alleviate the problem of the resource waste in an existing system.

An implementation of the present application provides an information pushing method, where the method includes the following: receiving an information acquisition request sent by a client, where the information acquisition request includes an identifier of a source display location and an identifier of a user that requests to obtain information; querying a display location trajectory diagram that corresponds to the user identifier, where an order in which the user historically browses display locations is recorded in the display location trajectory diagram; querying the display location trajectory diagram for a target display location adjacent to the source display location and after the source display location; and pushing information in the target display location to the client that corresponds to the user identifier.

Optionally, the display location trajectory diagram is constructed by using the following method: obtaining display location data uploaded by each client and historically browsed by the user, where the display location data includes a user identifier, a display location identifier, and a timestamp; and associating display locations that correspond to the display location identifiers in the display location data with the same user identifier in order of the timestamp, to generate the display location trajectory diagram that corresponds to the user identifier.

Optionally, the querying the display location trajectory diagram for a target display location adjacent to the source display location and after the source display location includes the following: querying the display location trajectory diagram for the target display location associated with the source display location and after the source display location; obtaining a priority of each target display location when there is more than one target display location; and determining a target display location with a highest priority as a final target display location.

Optionally, the priority of the target display location is obtained based on the number of user's browses.

Optionally, after the querying the display location trajectory diagram for a target display location adjacent to the source display location and after the source display location, the method further includes the following: querying a user preference diagram that corresponds to the user identifier, where an information type of information in a display location historically tapped by the user is recorded in the user preference diagram; and querying the user preference diagram for an information type that corresponds to an identified target display location based on the target display location; and the pushing information in the target display location to the client that corresponds to the user identifier includes the following: pushing information of an identified information type to the target display location in the client that corresponds to the user identifier.

Optionally, the user preference diagram is constructed by using the following method: obtaining information data uploaded by each client and historically tapped by the user, where the information data includes a user identifier, a display location identifier, and an information type; and associating the display location identifier with the information type in the information data with the same user identifier, to generate the user preference diagram that corresponds to the user identifier.

Optionally, the querying the user preference diagram for an information type that corresponds to an identified target display location based on the target display location includes the following: randomly determining an information type as the information type that corresponds to the target display location when the identified target display location is not identified in the user preference diagram based on the target display location.

Optionally, the pushing information of an identified information type to the target display location in the client that corresponds to the user identifier includes the following: obtaining a priority of each information type when there is more than one information type that corresponds to the identified target display location; determining information of an information type with a highest priority as information to be sent; and pushing the information to be sent to the target display location in the client that corresponds to the user identifier.

Optionally, the priority of the information type is determined based on the number of times of uploading the information type.

Optionally, the information includes an advertisement; the display location includes an advertisement display location; the information type includes an advertisement type; and the display location trajectory diagram includes an advertisement display location trajectory diagram.

An implementation of the present application provides an information pushing apparatus, where the apparatus includes the following: a receiving unit, configured to receive an information acquisition request sent by a client, where the information acquisition request includes an identifier of a source display location and an identifier of a user that requests to obtain information; a first query unit, configured to query a display location trajectory diagram that corresponds to the user identifier, where an order in which the user historically browses display locations is recorded in the display location trajectory diagram; a second query unit, configured to query the display location trajectory diagram for a target display location adjacent to the source display location and after the source display location; and a pushing unit, configured to push information in the target display location to the client that corresponds to the user identifier.

Optionally, the display location trajectory diagram is constructed by using a first acquisition subunit and a first generation subunit below: the first acquisition subunit is configured to obtain display location data uploaded by each client and historically browsed by the user, where the display location data includes a user identifier, a display location identifier, and a timestamp; and the first generation subunit is configured to associate display locations that correspond to the display location identifiers in the display location data with the same user identifier in order of the timestamp, to generate the display location trajectory diagram that corresponds to the user identifier.

Optionally, the second query unit includes the following: a display location query subunit, configured to query the display location trajectory diagram for the target display location associated with the source display location and after the source display location; a priority acquisition subunit, configured to obtain a priority of each target display location when there is more than one target display location; and a display location determining subunit, configured to determine a target display location with a highest priority as a final target display location.

Optionally, the priority of the target display location is obtained based on the number of user's browses.

Optionally, in addition to the second query unit, the apparatus further includes the following: a third query unit, configured to query a user preference diagram that corresponds to the user identifier, where an information type of information in a display location historically tapped by the user is recorded in the user preference diagram; and a fourth query unit, configured to query the user preference diagram for an information type that corresponds to an identified target display location based on the target display location.

The pushing unit includes the following: a pushing subunit, configured to push information of an identified information type to the target display location in the client that corresponds to the user identifier.

Optionally, the user preference diagram is constructed by using a second acquisition subunit and a second generation subunit below: the second acquisition subunit is configured to obtain information data uploaded by each client and historically tapped by the user, where the information data includes a user identifier, a display location identifier, and an information type; and a second generation subunit, configured to associate the display location identifier with the information type in the information data with the same user identifier, to generate the user preference diagram that corresponds to the user identifier.

Optionally, the second query unit includes the following: a query subunit, configured to randomly determine an information type as the information type that corresponds to the target display location when the identified target display location is not identified in the user preference diagram based on the target display location.

Optionally, the pushing unit includes the following: an information type acquisition subunit, configured to obtain a priority of each information type when there is more than one information type that corresponds to the identified target display location; an information determining subunit, configured to determine information of an information type with a highest priority as information to be sent; and an information pushing subunit, configured to push the information to be sent to the target display location in the client that corresponds to the user identifier.

Optionally, the priority of the information type is determined based on the number of times of uploading the information type.

Optionally, the information includes an advertisement; the display location includes an advertisement display location; the information type includes an advertisement type; and the display location trajectory diagram includes an advertisement display location trajectory diagram.

In the implementations of the present application, the display location trajectory diagram of the user can be constructed in advance in the order in which the user historically browses display locations. When the user browses information displayed in a current display location, a server can predict, based on the display location trajectory diagram, a next display location that is most likely to be browsed by the user, namely, the target display location; and then push the information in the target display location. Therefore, the determined target display location is not necessarily a display location next to the current display location. As such, the server can be prevented from still pushing information in a display location that is flicked by the user quickly and flashes by, to reduce meaningless consumption of system resources.

DESCRIPTION OF IMPLEMENTATIONS

Example implementations are described in detail here, and examples of the implementations are presented in the accompanying drawings. When the following description relates to the accompanying drawings, the same numbers in different accompanying drawings represent the same or similar elements unless specified otherwise. Implementations described in the following example implementations do not represent all implementations consistent with the present application. Instead, they are only examples of apparatuses and methods consistent with some aspects of the present application that are described in detail in the appended claims.

The terms used in the present application are merely for illustrating specific implementations, and are not intended to limit the present application. The terms "a" and "the" of singular forms used in the present application and the appended claims are also intended to include plural forms, unless otherwise specified in the context clearly. It should be further understood that the term "and/or" used in the present specification indicates and includes any or all possible combinations of one or more associated listed items.

It should be understood that although terms "first", "second", "third", etc. can be used in the present application to describe various types of information, the information is not limited to the terms. These terms are only used to differentiate information of a same type. For example, without departing from the scope of the present application, first information can also be referred to as second information, and similarly, the second information can be referred to as the first information. Depending on the context, for example, the word "if" used here can be explained as "while", "when", or "in response to determining".

Figure 2:
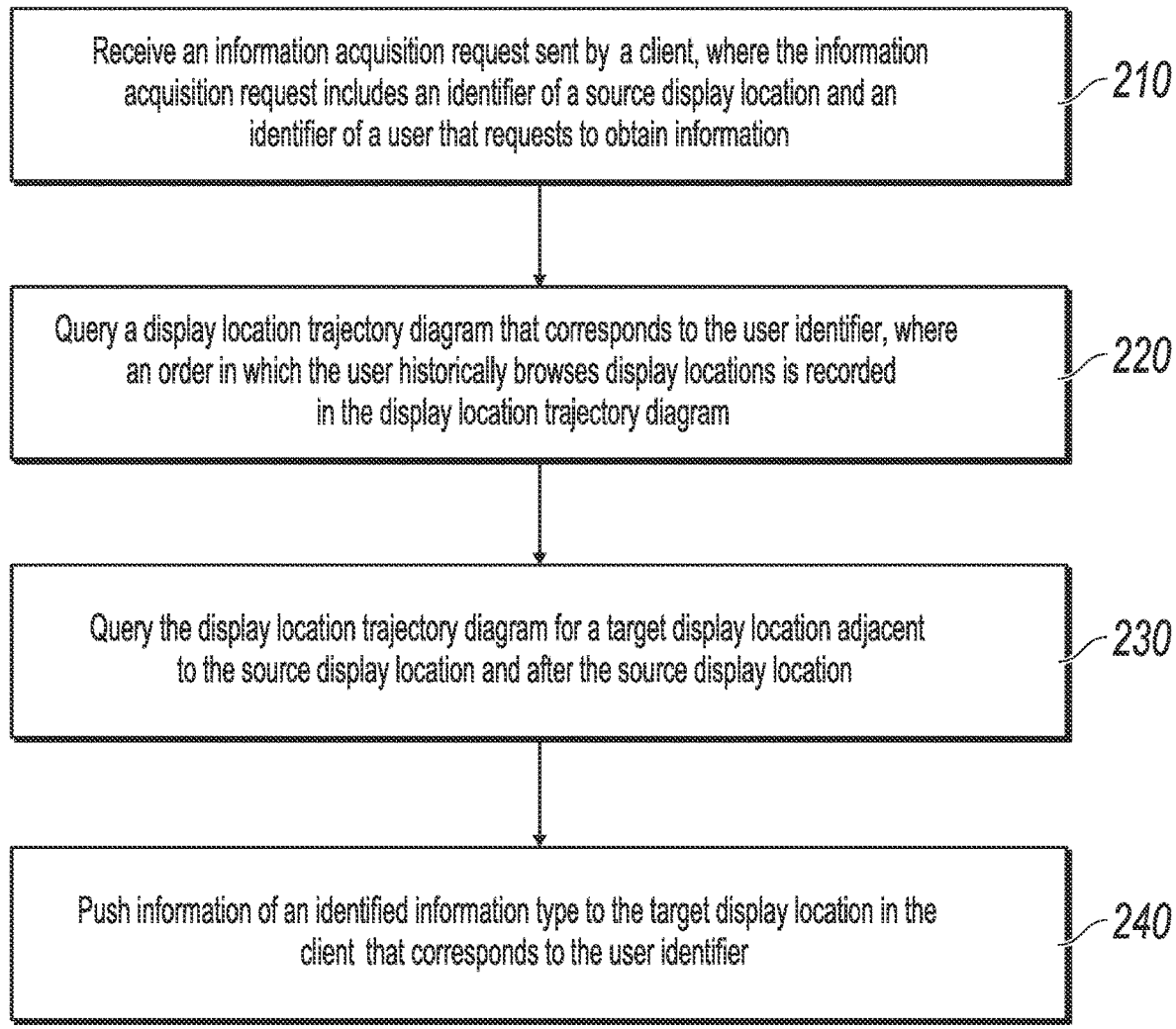
FIG. 2 is a flowchart illustrating an information pushing method, according to an implementation of the present application.

FIG. 2 is a flowchart illustrating an information pushing method, according to an implementation of the present application. The present implementation is described from the perspective of a server side. The method can include the following steps.

Step 210: Receive an information acquisition request sent by a client, where the information acquisition request includes an identifier of a source display location and an identifier of a user that requests to obtain information.

In the present implementation, the client can be an application on software, for example, an electronic wallet APP, an instant messaging APP, or a news APP. The display location mentioned in the present specification can be an area, in a client application interface, that is used to display information.

Figure 1:
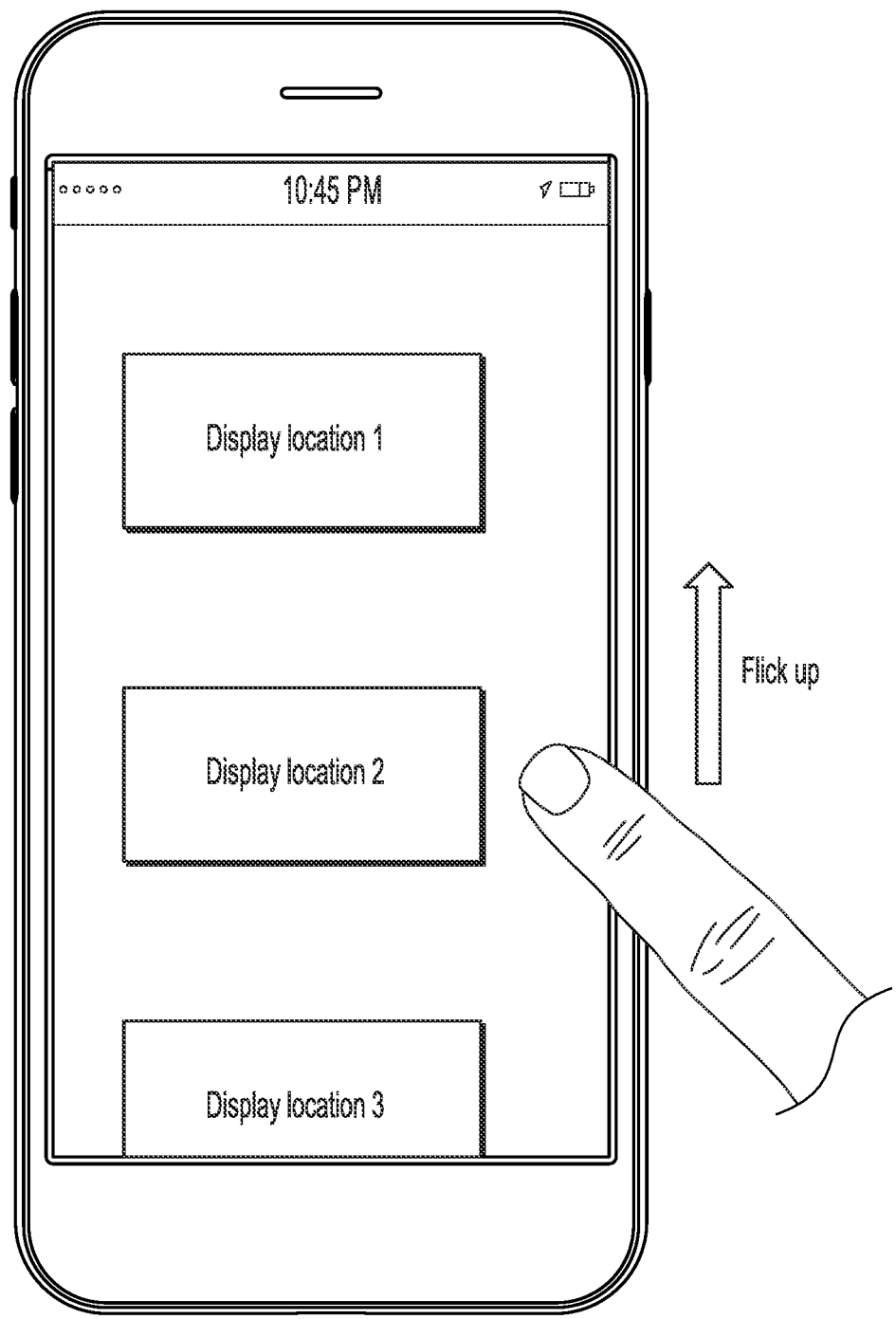
FIG. 1 is a schematic diagram illustrating display locations displayed on a client, according to the present application.

Continue to refer to the schematic diagram illustrating display locations displayed on a client shown in FIG. 1. In the present example, the display locations are located in different areas and are clearly distinguished from each other. When browsing information on the client, the user can view different information by flicking up and down. Different information is displayed in different display locations. In a process that the user browses information, the client can actively initiate the information acquisition request to the server. If the user browses display location 3 at the bottom of the interface, the information acquisition request can be used to obtain information that needs to be displayed in a next display location of display location 3. As described above, the information acquisition request includes a source display location identifier of display location 3 and the identifier of the user that requests to obtain information.

Figure 3:
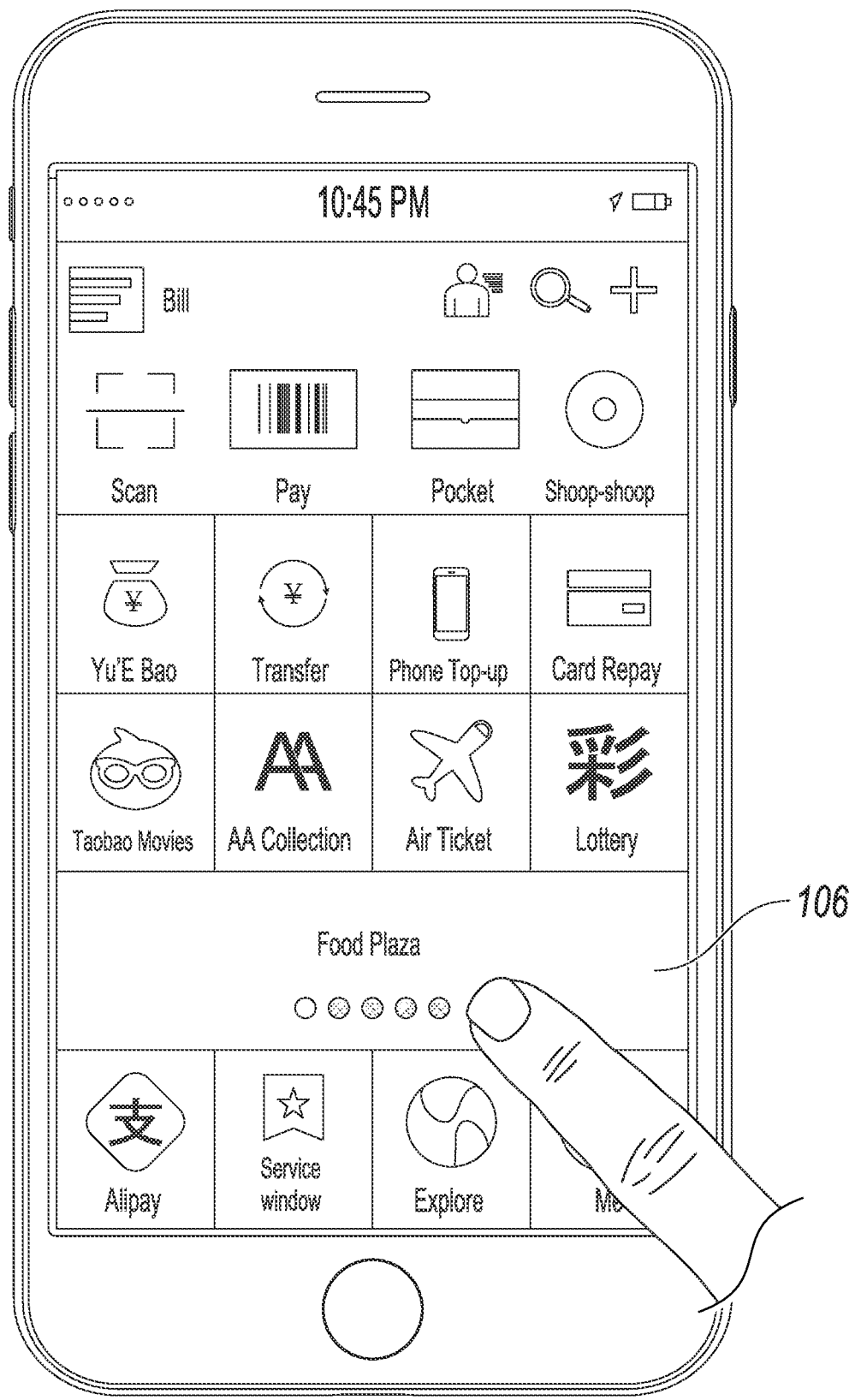
FIG. 3 is another schematic diagram illustrating display locations displayed on a client, according to the present application.

For another example, FIG. 3 is another schematic diagram of display locations displayed on a client. In the present example, the display locations are located in the same area. A user can control the client to display different information by flicking left and right. Similarly, in a process that the user browses information, the client can actively initiate the information acquisition request to the server. Area 106 has five different display locations (five small circles). Because the first display location is displayed currently, the information acquisition request sent by the client is used to obtain information that needs to be displayed in a next display location of the first display location. As described above, the information acquisition request includes a source display location identifier of the first display location and the identifier of the user that requests to obtain information.

The previous examples are only examples of a form of displaying the display locations. In an implementation, the display locations can also be displayed in other forms, for example, flicking up and down in the same area.

The source display location identifier is an identifier that corresponds to the last display location currently displayed on the client. As shown in FIG. 1, the source display location identifier is an identifier that corresponds to display location 3. In an implementation of actual applications, the source display location identifier can be a display location ID, for example, number 1, 2, or 3.

The user identifier can be a user ID, for example, a user account user_1 or user_2.

Step 220: Query a display location trajectory diagram that corresponds to the user identifier.

In the present implementation, an order in which the user historically browses display locations is recorded in the display location trajectory diagram.

The display location trajectory diagram can be constructed by using the following method:

A1: Obtain display location data uploaded by each client and historically browsed by the user, where the display location data includes a user identifier, a display location identifier, and a timestamp.

A2: Obtain information data uploaded by the client and tapped by the user, where the information data includes a user identifier, a display location identifier, and an information type.

A3: Associate display locations that correspond to the display location identifiers in the display location data with the same user identifier in order of the timestamp, to generate the display location trajectory diagram that corresponds to the user identifier.

A log tracing point is preset in the client, and then a log collection module of the client regularly collects the display location data historically browsed by the user, and uploads all the display location data to the server.

The "regularly" can be understood as a fixed time, for example, 8:00, 17:00, or 24:00 each day, every Monday; or can be understood as predetermined duration, that is, the log collection module of the client can start a timer, and collect a parameter when the timer reaches the predetermined duration. Certainly, in some implementations, the log collection module can perform collection irregularly. For example, the data can be uploaded to the server based on a data volume when a volume of the collected display location data and/or information data reaches a predetermined data volume.

In the present implementation, the log can be used to record a user's operation. The log tracing point is used to add some special functions to original functional logic of the log. Configuration can be performed in the log through a log collection interface, for example, the number of times that the user taps a button is counted.

In the present implementation, the log tracing point is mainly used to collect statistics about the display location data historically browsed by the user.

The display location data can include the user identifier, the display location identifier, and the timestamp.

The following describes how the client determines whether the user browsed the display location.

Example 1

FIG. 1 is used as an example. The client first displays information in display locations 1, 2, and 3, and then sequentially displays information in display location 4, information in display location 5, etc. as the user flicks the display locations up. However, if the user flicks the display locations quickly or a flick amplitude is relatively large when the user flicks the display locations up, display location 4 and display location 5 flash by, and information in display locations 6, 7, and 8 is displayed finally. In this case, the client can determine that display locations 4 and 5 are not browsed by the user. In other words, whether the user browsed the display location can be determined based on whether duration of the display location staying on a screen reaches predetermined duration.

The predetermined duration can be an empirical value that is set manually. For example, the value can be 5 seconds. In this case, it can be considered that the user browses the display location if the duration of the display location staying on the screen of the client reaches 5 seconds. On the contrary, it can be considered that the user does not browse the display location if the duration does not reach 5 seconds. A subsequent browsed display location in the present specification can be understood as a display location whose duration reaches the predetermined duration.

For example, if the user browses a display location, a system log records display location data, namely, a display location identifier, a user identifier, and a timestamp. The timestamp is a timestamp at which a moment of the display location is displayed when the user browses the display location. Assume that the user identifier is user_1, the display location identifier is 4, and the timestamp is 1474873552 (namely, 15:5:52 9/26/2016). The log collection module can upload the collected display location data (user_1, 4, 1474873552) to the server.

After obtaining the display location data uploaded by each client and historically browsed by the user, the server can associate the display locations that correspond to the display location identifiers in the display location data with the same user identifier in order of the timestamp.

In the present implementation, a sequence relationship between different display locations can be determined by using an order of timestamps, to further determine a source display location and a target display location. The source display location and the target display location are relative concepts. The former display location is a source display location relative to the latter display location, and the latter display location is a target display location relative to the former display location. A display location is a target display location relative to a source display location of the display location, but is a source display location relative to a target display location of the display location.

Display locations are connected to form a chain by using timestamps, and a loop can be formed if there are the same display locations.

As described in Example 1 above, assume that the client records the following six sets of display location data: first display location data {user_1, 1, 1474873552}, where user_1 is a user identifier, 1 is a display location identifier, and 1474873552 is a timestamp, which have the same meaning as the following; second display location data {user_1, 2, 1474873553}; third display location data {user_1, 3, 1474873554}; fourth display location data {user_1, 6, 1474873570}; fifth display location data {user_1, 7, 1474873571}; and sixth display location data {user_1, 8, 1474873572}.

After obtaining the display location data uploaded by the client, the server can determine the six sets of display location data as a browsing history of the same user because the six sets of display location data have the same user identifier user_1.

Afterwards, an order of each display location can be determined based on the timestamps. The six sets of display location data are sequentially: 1474873552 (15:5:52 9/26/2016), 1474873553 (15:5:53 9/26/2016), 1474873554 (15:5:54 9/26/2016), 1474873570 (15:6:10 9/26/2016), 1474873571 (15:6:11 9/26/2016), and 1474873572 (15:6:12 9/26/2016). In a schematic diagram of display locations shown in FIG. 4, display location 1 is associated with display location 2, and display location 1 points to display location 2. In this case, it can indicate that the user browses display location 1 and then browses display location 2.

Display location 2 is associated with display location 3, and display location 2 points to display location 3. In this case, it can indicate that the user browses display location 2 and then browses display location 3.

Display location 3 is associated with display location 6, and display location 3 points to display location 6. In this case, it can indicate that a browsing trajectory is that the user browses display location 3 and then browses display location 6.

Display location 6 is associated with display location 7, and display location 6 points to display location 7. In this case, it can indicate that a browsing trajectory is that the user browses display location 6 and then browses display location 7.

Display location 7 is associated with display location 8, and display location 7 points to display location 8. In this case, it can indicate that a browsing trajectory is that the user browses display location 7 and then browses display location 8.

Figure 4:
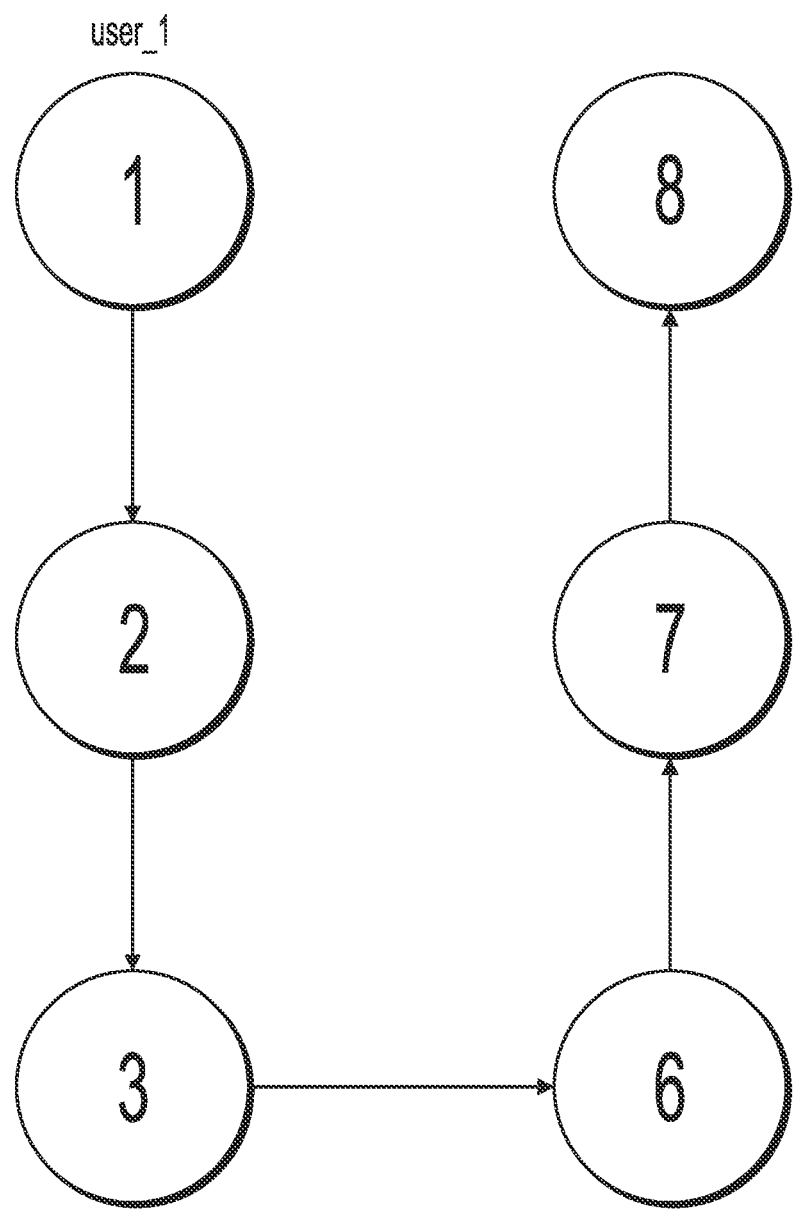
FIG. 4 illustrates a display location trajectory diagram, according to an implementation of the present application.

It can be seen from the display location trajectory diagram shown in FIG. 4 that the user first browses display locations 1, 2, and 3, then flicks the screen quickly, skips display locations 4 and 5, and directly browses display locations 6, 7, and 8.

In practice, display location data uploaded by different clients usually corresponds to different users, and the server generates a corresponding display location trajectory diagram for each user identifier.

There are usually display location trajectory diagrams of different users on the server. Therefore, after receiving the information acquisition request sent by the client, the server can query the display location trajectory diagram that corresponds to the user identifier based on the user identifier included in the information acquisition request.

In practice, after generating the display location trajectory diagram, the server can associate the display location trajectory diagram with the user identifier, and store the display location trajectory diagram in a graph database.

Therefore, when querying for the display location trajectory diagram that corresponds to the user identifier, the server can query the graph database for the display location trajectory diagram that corresponds to the user identifier.

Step 230: Query the display location trajectory diagram for a target display location adjacent to the source display location and after the source display location.

In the present implementation, as described above, the target display location is adjacent to the source display location, and the source display location points to the target display location, that is, the target display location is after the source display location.

In the present implementation, after identifying the display location trajectory diagram that corresponds to the user identifier, the server can further query the display location trajectory diagram for the target display location adjacent to the source display location and after the source display location.

Based on Example 1, with reference to the schematic diagram of the client shown in FIG. 1, the user browses information again, and display locations 1, 2, and 3 are displayed on the screen of the client currently. In this case, the client sends an information acquisition request to the server. The information acquisition request includes the user identifier user_1 and source display location identifier 3. In this case, the server can identify the corresponding display location trajectory diagram based on the user identifier user_1, as shown in FIG. 4. Because the source display location identifier is 3, the server queries that a target display location adjacent to source display location 3 and after source display location 3 is 6.

It can be seen from the example in the present step that, in the present implementation, the target display location that is most likely to be browsed after the user browses a current display location can be determined based on the display location trajectory diagram of the user and in the order in which the user historically browses the display locations. In other words, in the present implementation, when the user browses the current display location, information in a next display location is not necessarily sequentially obtained. When the source display location displayed currently on the client in the example of the present step is display location 3, the client can obtain information in display location 6 instead of obtaining information in display location 4 in a fixed order of display locations in the existing technology.

Step 240: Push information in the target display location to the client that corresponds to the user identifier.

In the present implementation, after determining the target display location, the server can push the information in the target display location to the client that corresponds to the user identifier.

Correspondingly, on the client side, after receiving the information in the target display location that is pushed by the server, the client can display the information in the target display location. Because information pushing is preprocessed, when the server returns the information, the target display location may not have been browsed on the client. In this case, the client can first cache the returned information, and directly use the cached information when the user browses the target display location.

According to the present implementation of the present application, the display location trajectory diagram of the user can be constructed in advance in the order in which the user historically browses display locations. When the user browses information displayed in a current display location, the server can predict, based on the display location trajectory diagram, the next display location that is most likely to be browsed by the user, namely, the target display location; and then push the information in the target display location. Therefore, the determined target display location is not necessarily a display location next to the current display location. As such, the server can be prevented from still pushing information in a display location that is flicked by the user quickly and flashes by, to reduce meaningless consumption of system resources.

In practice, there may be more than one target display location for the source display location. In a display location trajectory diagram shown in FIG. 5, target display locations of display location 3 are 4 and 10. In this case, the server can determine both display locations 4 and 10 as target display locations to push information about the two display locations to the client, that is, push a plurality of pieces of information when there are a plurality of target display locations. However, due to the limitation of the screen of the client, the user cannot simultaneously browse information in display locations far away from each other, and therefore it may be meaningless to push more information. Consequently, system resources are consumed.

To alleviate the problem, in an implementation of the present application, the querying the display location trajectory diagram for a target display location adjacent to the source display location and after the source display location in step 230 can include the following steps: querying the display location trajectory diagram for a target display location adjacent to the source display location and after the source display location; and obtaining a priority of each target display location when there is more than one target display location; and determining a target display location with a highest priority as a final target display location.

Figure 5:
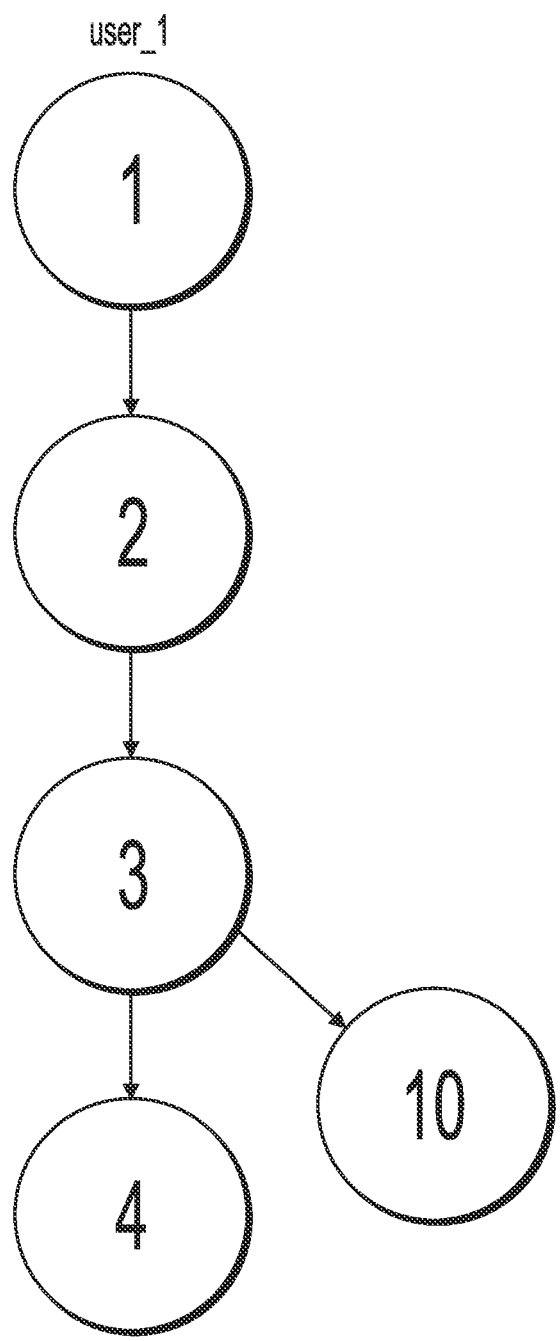
FIG. 5 is a schematic diagram illustrating a plurality of target display locations, according to an implementation of the present application.

In the present implementation, different target display locations have different priorities. Still as shown in FIG. 5, there are two target display locations of display location 3, namely, display location 4 and display location 10. If a priority of display location 10 is higher than a priority of display location 4, it can be determined that display location 10 is the target display location.

Generally, the priority of the display location can be determined based on the number of user's browses. For example, a larger number of browses indicates a higher priority. On the contrary, a smaller number of browses indicates a lower priority. For example, for target display locations 4 and 10 of display location 3, because the number of user's browses in display location 10 is 10, and the number of user's browses in display location 4 is 5, the priority of display location 10 is high, and the priority of display location 4 is low.

In the implementations described above, when information in the target display location is pushed, information of a particular type is usually pushed based on a group that the user belongs to. For example, information such as books, training, and postgraduate entrance examination is pushed for students, and information such as travel, shopping, and recruitment is pushed for white-collar workers. However, pushing information of this type is mainly set by an operator depending on experience, and pushed information usually cannot accurately match an interest of the user. Consequently, meaningless pushing is caused, and accordingly user experience degrades.

Figure 6:
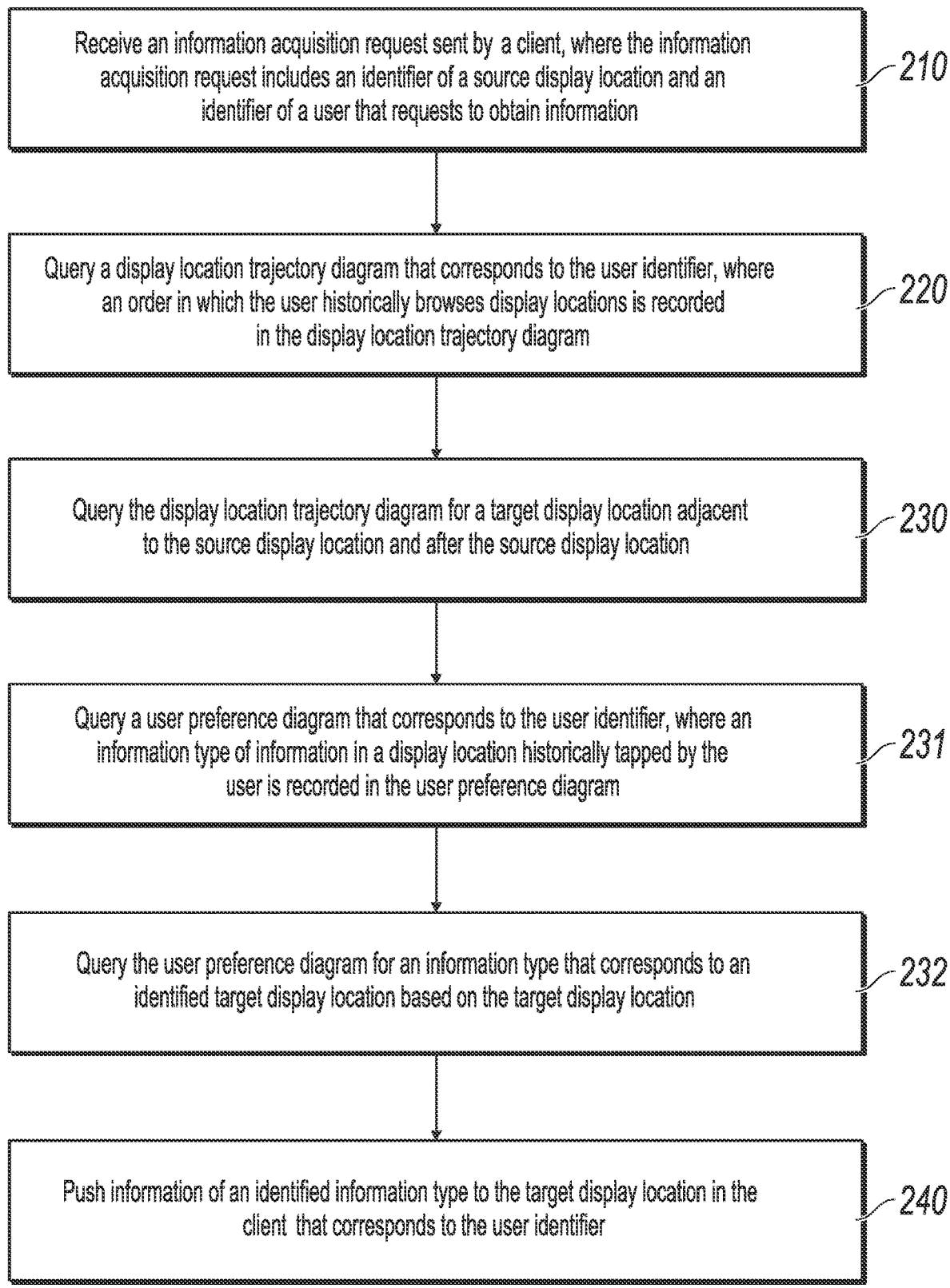
FIG. 6 is a flowchart illustrating an information pushing method, according to an implementation of the present application.

To alleviate the problem, in another implementation of the present application, as shown in FIG. 6, after step 230, the method can further include the following steps.

Step 231: Query a user preference diagram that corresponds to the user identifier.

In the present implementation, an information type of information in a display location historically tapped by the user is recorded in the user preference diagram.

The user preference diagram can be constructed by using the following method:

B1: Obtain information data uploaded by each client and historically tapped by the user, where the information data includes a user identifier, a display location identifier, and an information type.

B2: Associate the display location identifier with the information type in the information data with the same user identifier, to generate the user preference diagram that corresponds to the user identifier.

The log tracing point described above can be further used to collect statistics about the information data historically tapped by the user.

The information data can include the user identifier, the display location identifier, and the information type.

For example, when the user is interested in information in a display location, the user usually taps the display location to view specific content. In this case, the system log records information data, namely, a display location identifier of the display location where the information is located, a user identifier, and an information type of the information. Assume that the user identifier is user_1, the display location identifier is 4, and the information type is football. The log collection module can upload the collected information data (user_1, 4, football) to the server.

After obtaining the information data uploaded by each client and historically tapped by the user, the server can associate the display location identifier with the information type in the information data with the same user identifier.

The content described in Example 1 is still used. Assume that the user taps display locations 1, 2, 6, and 8 in a browsing process, and the client records the following four sets of information data: first information data {user_1, 1, car}, where user_1 is a user identifier, 1 is a display location identifier, and car is an information type, which have the same meaning as the following; second information data {user_1, 2, games}; third information data {user_1, 6, sports}; and fourth information data {user_1, 8, music}.

After obtaining the information data uploaded by the client, the server can determine the four sets of information data as a tapping history of the same user because the four sets of information data have the same user identifier user_1.

Then the display location identifier is associated with the information type in each piece of information data.

1 (display location identifier) is associated with car (information type), for example, 1-car.

2 (display location identifier) is associated with games (information type).

6 (display location identifier) is associated with sports (information type).

8 (display location identifier) is associated with music (information type). Therefore, a user preference diagram that corresponds to the user identifier user_1 shown in FIG. 7 is generated.

Figure 7:
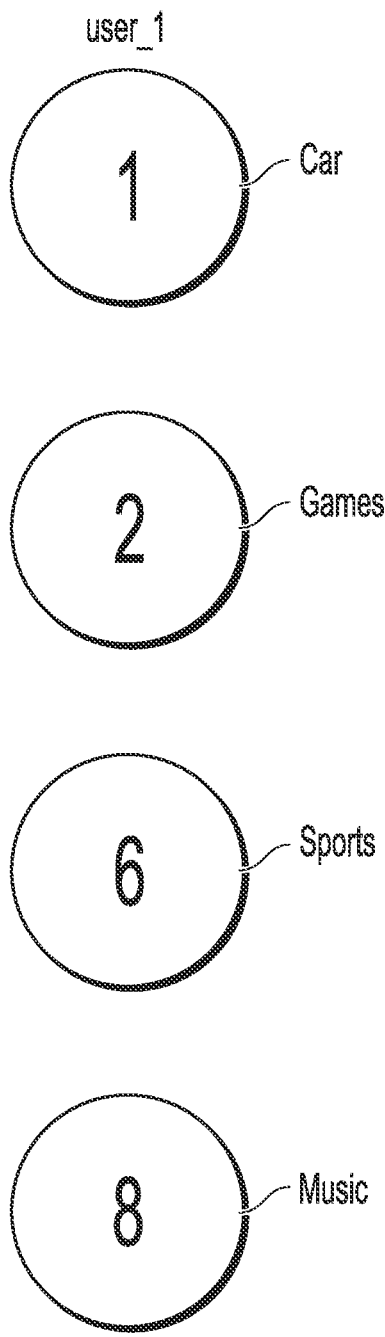
FIG. 7 illustrates a user preference diagram, according to an implementation of the present application.

According to the user preference diagram shown in FIG. 7, when the user browses next time, information displayed in display location 1 is still information of a car type, information displayed in display location 2 is still information of a games type, information displayed in display location 6 is still information of a sports type, and information displayed in display location 8 is still information of a music type. Because there is no information type in display locations 2 and 7, information displayed in display locations 2 and 7 is not necessarily information of a previous information type, and is likely to be information of a type that is randomly displayed.

In practice, information data uploaded by different clients usually corresponds to different users, and the server generates a corresponding user preference diagram for each user identifier.

There are usually user preference diagrams of different users on the server. Therefore, after receiving the information acquisition request sent by the client, the server can query the user preference diagram that corresponds to the user identifier based on the user identifier included in the information acquisition request.

In practice, after generating the user preference diagram, the server can associate the user preference diagram with the user identifier, and store the user preference diagram in the graph database.

Therefore, when querying for the user preference diagram that corresponds to the user identifier, the server can query the graph database for the user preference diagram that corresponds to the user identifier.

Step 232: Query the user preference diagram for an information type that corresponds to an identified target display location based on the target display location.

After performing step 230, the server can identify the target display location, and can further query the user preference diagram for the information type that corresponds to the target display location.

In the user preference diagram shown in FIG. 7, if the target display location is 6, it can be identified that an information type that corresponds to target display location 6 is sports.

Correspondingly, step 240 can include the following: pushing information of an identified information type to the target display location in the client that corresponds to the user identifier.

Generally, the information can be information of the information type obtained by the server from a predetermined information base based on the identified information type that corresponds to the target display location.

In some implementations, different information of the same information type can have different priorities. Therefore, when obtaining information, information with a higher priority can be obtained preferentially in order of priorities. Therefore, the server can push the information of the identified information type to the target display location in the client that corresponds to the user identifier.

Correspondingly, on the client side, when receiving the information in the target display location pushed by the server, the client can display the information in the target display location. Because information pushing is preprocessed, when the server returns the information, the target display location may not have been browsed on the client. In this case, the client can first cache the returned information, and directly use the cached information when the user browses the target display location.

According to the present implementation, the display location trajectory diagram of the user can be constructed in advance in the order in which the user historically browses display locations, and the user preference diagram of the user can be constructed based on the information type of the information in the display location historically tapped by the user. When the user browses information displayed in the current display location, the server can predict, based on the display location trajectory diagram, a next display location that is most likely to be browsed by the user, and can further push information of interest to the user in advance based on the user preference diagram, to improve the probability that the user taps the information, improve user experience, and reduce meaningless consumption of system resources. The client can pre-obtain the next display location that is most likely to be browsed by the user and that is pushed by the server and the information of interest to the user that is to be displayed, and display the information immediately when the user actually browses the next display location.

As described above, only the information type of the information in the display location historically tapped by the user is recorded in the user preference diagram. In practice, if the identified target display location is not historically tapped by the user, the information type of the target display location does not exist in the user preference diagram. Accordingly, the target display location and the information type that corresponds to the target display location are not identified in the user preference diagram.

For the problem, in still another implementation of the present application, the querying the user preference diagram for an information type that corresponds to an identified target display location based on the target display location in step 232 includes the following: randomly determining an information type as the information type that corresponds to the target display location when the identified target display location is not identified in the user preference diagram based on the target display location.

According to the present implementation, an information type that corresponds to a target display location can be determined even if the target display location is not identified in the user preference diagram, to continue to perform subsequent steps.

It is worthwhile to note that, when both the display location trajectory diagram and the user preference diagram are applied, the priority of the display location can be alternatively obtained by using the following method: obtaining an information type recorded in the target display location; matching the information type recorded in the target display location with an information type recorded in the source display location; obtaining a priority of a successfully matched information type in the source display location; and determining the priority in the display location as a priority of the successfully matched target display location.

In the present implementation, assume that in the user preference diagram, information types in source display location 3 include football, basketball, and table tennis, information types in target display location 10 include table tennis and swimming, and information types in target display location 4 include basketball and mountain climbing. It can be learned through matching that an information type in target display location 10 that successfully matches an information type in source display location 3 is table tennis, and an information type in target display location 4 that successfully matches an information type in source display location 3 is basketball. In source display location 3, assume that a priority of table tennis is high, and a priority of basketball is low. Therefore, a priority of target display location 10 can be set to be high, and a priority of target display location 4 can be set to be low.

According to the present implementation, when there is more than one target display location, the priority of the display location is used, so that the target display location with the higher priority can be determined as the final target display location. As such, a case that a plurality of pieces of information need to be pushed due to a plurality of target display locations can be alleviated, to reduce meaningless consumption of system resources.

In practice, there may be more than one information type recorded in the display location. For example, information types recorded in the same display location include science and technology, games, and education. Because only one type of information can be displayed in one display location, the problem of how to select a type of information of most interest to the user from a plurality of information types needs to be alleviated.

To alleviate the problem, in an implementation of the present application, step 240 can include the following steps: obtaining a priority of each information type when there is more than one information type recorded in the identified target display location; and pushing information of an information type with a highest priority to the client that corresponds to the user identifier.

In the present implementation, the priority of the information type can be determined based on the number of times of uploading the information type. In other words, a larger number of uploading times indicates a higher priority. On the contrary, a smaller number of uploading times indicates a lower priority. For example, in the same display location, the number of times of tapping information of a science and technology type is 5, the number of times that the user taps information of a game type is 10, and the number of times that the user taps information of an education type is 8. In this case, games have the highest priority, education has the second highest priority, and science and technology have the lowest priority.

According to the present implementation, when more than one information type is recorded in the target display location, the server can use the priority of the information type to push the information of the information type with the highest priority to the client. As such, not only the selection problem can be alleviated, but also the selected information type is a type of information of most interest to the user, to improve the tapping probability of the user and improve user experience.

In an implementation of the present application, the information includes an advertisement; the display location includes an advertisement display location; the information type includes an advertisement type; and the display location trajectory diagram includes an advertisement display location trajectory diagram.

The present implementation can be applied to an advertisement serving scenario, and the advertisement display location trajectory diagram of the user can be constructed in advance in an order in which the user historically browses advertisement display locations. When the user browses an advertisement displayed in a current advertisement display location, the server can predict, based on the advertisement display location trajectory diagram, a next advertisement display location that is most likely to be browsed by the user; and then push information in the predicted advertisement display location. In addition, a user preference diagram can be constructed in advance based on a type of an advertisement in an advertisement display location historically tapped by the user, and an advertisement of interest to the user that corresponds to the predicted advertisement display location can be pushed, to improve the probability that the user taps the advertisement, improve user experience, and reduce meaningless consumption of system resources. The client can pre-obtain the next advertisement display location that is most likely to be browsed by the user and that is pushed by the server and the advertisement of interest to the user that is to be displayed, and display the advertisement immediately when the user actually browses the next advertisement display location.

The present application further provides an information pushing apparatus implementation that corresponds to the previous information pushing method implementation.

Figure 8:
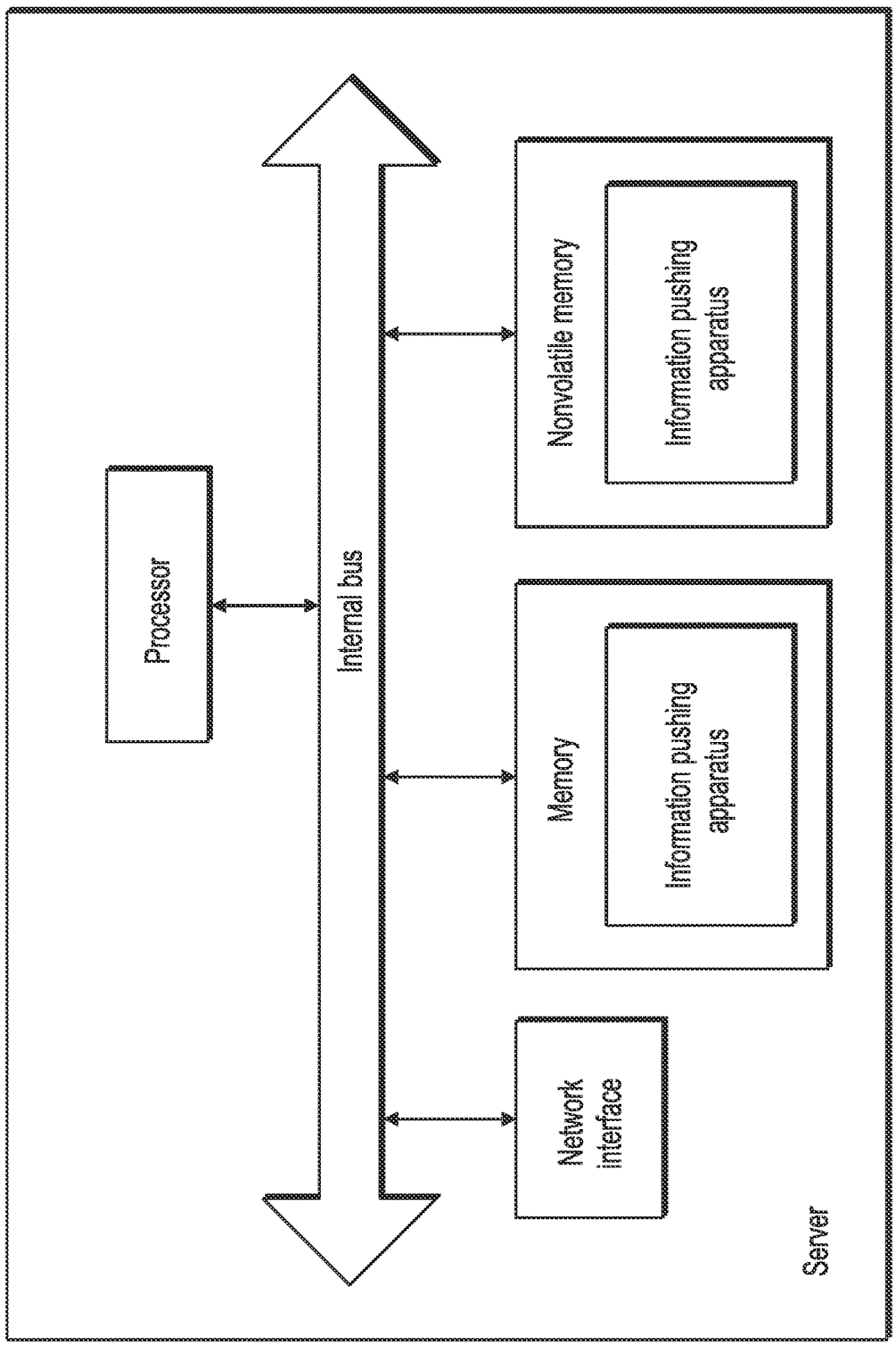
FIG. 8 is a structural diagram of hardware of a device where an information pushing apparatus is located, according to the present application.

Implementations of the information pushing apparatus in the present application can be separately applied to an information pushing device. The apparatus implementation can be implemented by software, hardware, or a combination of hardware and software. Software implementation is used as an example. As a logical apparatus, the apparatus is formed by reading a corresponding computer program instruction in a nonvolatile memory to a memory by a processor of a device where the apparatus is located. In terms of hardware, FIG. 8 is a structural diagram illustrating hardware of the device where the information pushing apparatus in the present application is located. In addition to a processor, a network interface, a memory, and a nonvolatile memory shown in FIG. 8, the device where the apparatus is located in the present implementation usually can further include other hardware based on an actual function of the information pushing apparatus. Details are omitted here for simplicity.

Figure 9:
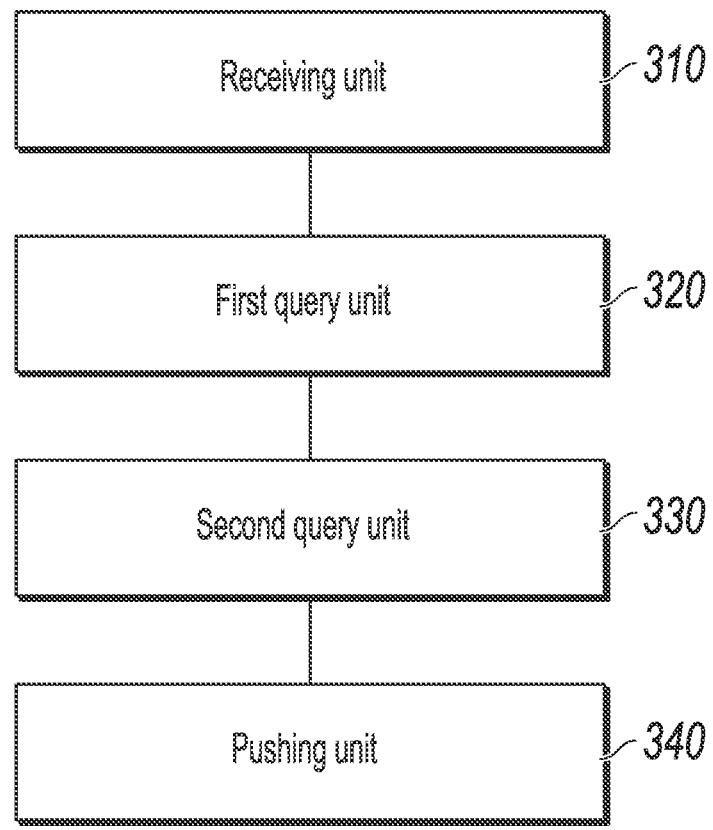
FIG. 9 is a schematic diagram illustrating modules of an information pushing apparatus, according to an implementation of the present application.

FIG. 9 is a diagram illustrating modules of an information pushing apparatus, according to an implementation of the present application. The present implementation is described from the perspective of a server side. The apparatus includes a receiving unit 310, a first query unit 320, a second query unit 330, and a pushing unit 340.

The receiving unit 310 is configured to receive an information acquisition request sent by a client, where the information acquisition request includes an identifier of a source display location and an identifier of a user that requests to obtain information.

The first query unit 320 is configured to query a display location trajectory diagram that corresponds to the user identifier, where an order in which the user historically browses display locations is recorded in the display location trajectory diagram.

The second query unit 330 is configured to query the display location trajectory diagram for a target display location adjacent to the source display location and after the source display location.

The pushing unit 340 is configured to push information in the target display location to the client that corresponds to the user identifier.

In an optional implementation, the display location trajectory diagram is constructed by using a first acquisition subunit and a first generation subunit below: the first acquisition subunit is configured to obtain display location data uploaded by each client and historically browsed by the user, where the display location data includes a user identifier, a display location identifier, and a timestamp; and the first generation subunit is configured to associate display locations that correspond to the display location identifiers in the display location data with the same user identifier in order of the timestamp, to generate the display location trajectory diagram that corresponds to the user identifier.

In an optional implementation, the second query unit 330 includes the following: a display location query subunit, configured to query the display location trajectory diagram for the target display location associated with the source display location and after the source display location; a priority acquisition subunit, configured to obtain a priority of each target display location when there is more than one target display location; and a display location determining subunit, configured to determine a target display location with a highest priority as a final target display location.

In an optional implementation, the priority of the target display location is obtained based on the number of user's browses.

In an optional implementation, in addition to the second query unit 330, the apparatus further includes the following: a third query unit, configured to query a user preference diagram that corresponds to the user identifier, where an information type of information in a display location historically tapped by the user is recorded in the user preference diagram; and a fourth query unit, configured to query the user preference diagram for an information type that corresponds to an identified target display location based on the target display location.

The pushing unit 340 includes the following: a pushing subunit, configured to push information of an identified information type to the target display location in the client that corresponds to the user identifier.

In an optional implementation, the user preference diagram is constructed by using a second acquisition subunit and a second generation subunit below: the second acquisition subunit is configured to obtain information data uploaded by each client and historically tapped by the user, where the information data includes a user identifier, a display location identifier, and an information type; and a second generation subunit, configured to associate the display location identifier with the information type in the information data with the same user identifier, to generate the user preference diagram that corresponds to the user identifier.

In an optional implementation, the second query unit includes the following: a query subunit, configured to randomly determine an information type as the information type that corresponds to the target display location when the identified target display location is not identified in the user preference diagram based on the target display location.

In an optional implementation, the pushing unit 340 includes the following: an information type acquisition subunit, configured to obtain a priority of each information type when there is more than one information type that corresponds to the identified target display location; an information determining subunit, configured to determine information of an information type with a highest priority as information to be sent; and an information pushing subunit, configured to push the information to be sent to the target display location in the client that corresponds to the user identifier.

In an optional implementation, the priority of the information type is determined based on the number of times of uploading the information type.

In an optional implementation, the information includes an advertisement; the display location includes an advertisement display location; the information type includes an advertisement type; and the display location trajectory diagram includes an advertisement display location trajectory diagram.

For an implementation process of functions and roles of each unit in the apparatus, references can be made to an implementation process of corresponding steps in the previous method. Details are omitted here for simplicity.

Because an apparatus implementation basically corresponds to a method implementation, for related parts, references can be made to related descriptions in the method implementation. The previously described apparatus implementation is merely an example. The units described as separate parts may or may not be physically separate, and parts displayed as units may or may not be physical units, may be located in one position, or may be distributed on a plurality of network units. Some or all of the modules can be selected based on actual needs to achieve the objectives of the solutions in the present application. A person of ordinary skill in the art can understand and implement the implementations of the present application without creative efforts.

A person skilled in the art can easily figure out another implementation solution of the present application after considering the present specification and practicing the disclosed invention here. The present application is intended to cover any variations, functions, or adaptive changes of the present application. These variations, functions, or adaptive changes comply with general principles of the present application, and include common knowledge or a commonly used technical means in the technical field that is not disclosed in the present application. The present specification and the implementations are considered as examples only. The actual scope and the spirit of the present application are pointed out by the following claims.

It should be understood that the present application is not limited to the accurate structures described above and shown in the accompanying drawings, and modifications and changes may be made without departing from the scope of the present application. The scope of the present application is limited only by the appended claims.

Figure 10:
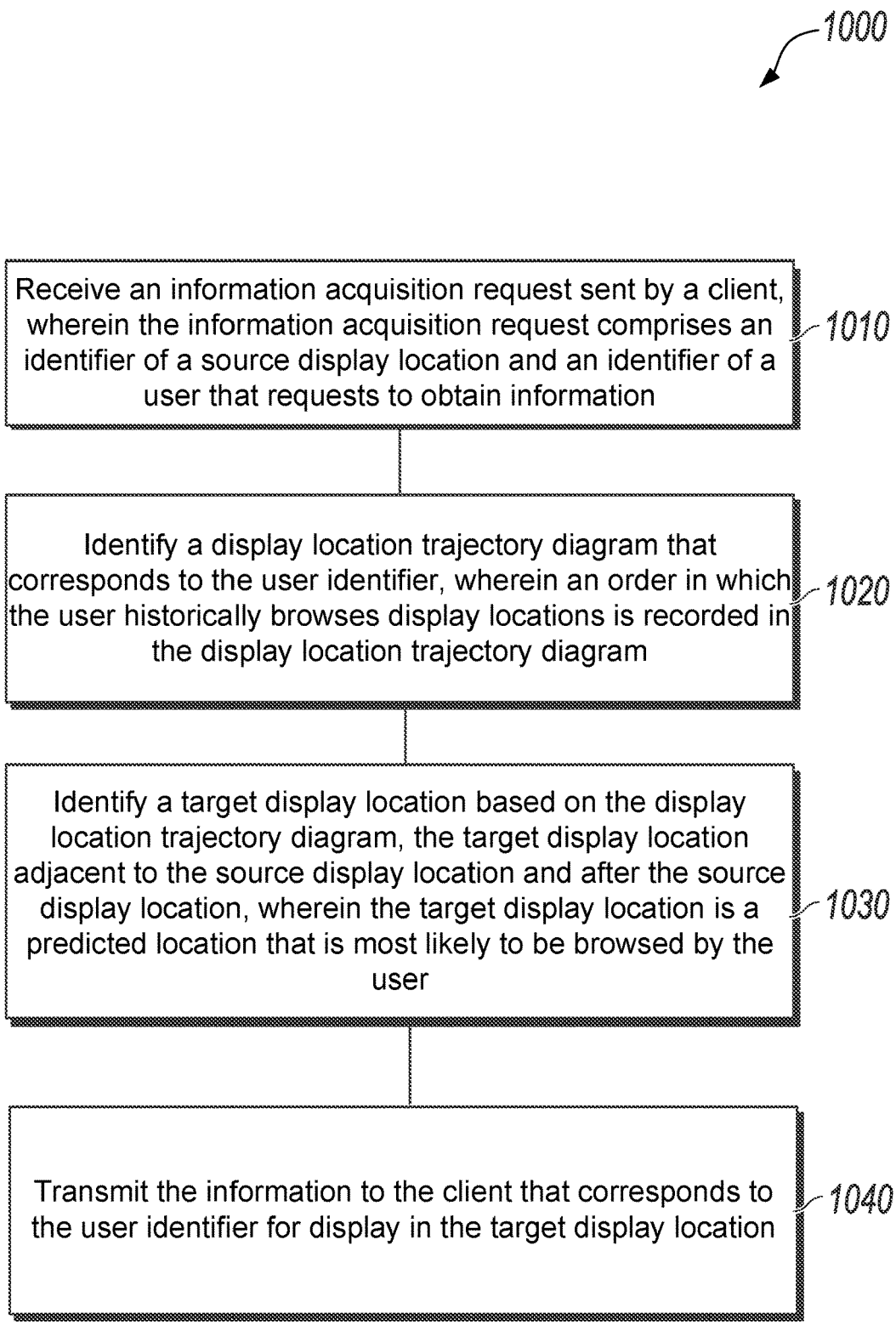
FIG. 10 is a flowchart illustrating an example of a computer-implemented method for targeted information display based on historical user behavior, according to an implementation of the present disclosure.

FIG. 10 is a flowchart illustrating an example of a computer-implemented method for targeted information display based on historical user behavior, according to an implementation of the present disclosure. For clarity of presentation, the description that follows generally describes method 1000 in the context of the other figures in this description. However, it will be understood that method 1000 can be performed, for example, by any system, environment, software, and hardware, or a combination of systems, environments, software, and hardware, as appropriate. In some implementations, various steps of method 1000 can be run in parallel, in combination, in loops, or in any order.

At 1010, an information acquisition request sent by a client is received, wherein the information acquisition request comprises an identifier of a source display location and an identifier of a user that requests to obtain information.

At 1020, a display location trajectory diagram is identified that corresponds to the user identifier, wherein an order in which the user historically browses display locations is recorded in the display location trajectory diagram. In some cases, the display location trajectory diagram includes display location data uploaded by the client and representing display locations historically browsed by the user, wherein the display location data comprises a user identifier, a display location identifier, and a timestamp, and wherein display locations that correspond to the display location identifiers in the display location data are associated with the same user identifier in order of the timestamp. In some implementations, identifying the display location trajectory diagram for the target display location adjacent to the source display location and after the source display location comprises: identifying the display location trajectory diagram for the target display location associated with the source display location and after the source display location; determining that there is more than one target display location; in response to determining that there is more than one target display location, retrieving a priority of each target display location; and determining a target display location with a highest priority as a final target display location. In some implementations, the priority of the target display location is based on a number of times the user has browsed the target display location.

At 1030, a target display location is identified based on the display location trajectory diagram, the target display location adjacent to the source display location and after the source display location, wherein the target display location is a predicted location that is most likely to be browsed by the user.

At 1040, information is transmitted to the client that corresponds to the user identifier for display in the target display location. In some cases, transmitting the information to the client that corresponds to the user identifier for display in the target display location includes pushing information of the identified information type to the target display location in the client that corresponds to the user identifier. In some implementations, pushing information of the identified information type to the target display location in the client that corresponds to the user identifier comprises: determining that there is more than one target display location; in response to determining that there is more than one target display location, retrieving a priority of each information type; determining information of an information type with a highest priority as information to be sent; and pushing the information to be sent to the target display location in the client that corresponds to the user identifier. In some cases, the priority of the information type is determined based on the number of uploads associated with the information type.

In some cases, the method 1000 includes, after identifying the display location trajectory diagram for the target display location adjacent to the source display location and after the source display location, identifying a user preference diagram that corresponds to the user identifier, the user preference diagram indicating an information type in a display location historically tapped by the user; and querying the user preference diagram for an information type that corresponds to an identified target display location based on the target display location. In some implementations, the user preference diagram includes information data uploaded by each client and historically tapped by the user, wherein the information data comprises a user identifier, a display location identifier, and an information type, wherein the user preference diagram associates the display location identifier with information type in the information data with the same user identifier. In some cases, querying the user preference diagram for an information type that corresponds to an identified target display location based on the target display location comprises: determining whether the identified target display location is not identified in the user preference diagram based on the target display location; and in response to determining that the identified target display location is not identified in the user preference diagram based on the target display location, randomly determining an information type as the information type that corresponds to the target display location.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

The invention claimed is:

1. A computer-implemented method for targeted information display based on historical user behavior, the method comprising:
   determining a direction of scrolling for a graphical user interface of a client device, the graphical user interface having a plurality of display locations arranged in an order, wherein each display location of the plurality of display locations occupies a corresponding position in the graphical user interface;
   determining a source display location of the plurality of display locations as a most recent display location to enter a display area of the client device in accordance with the direction of scrolling;
   receiving an information acquisition request sent by the client device, wherein the information acquisition request comprises an identifier of the source display location of the plurality of display locations and a user identifier of a user that requests to obtain information;
   identifying a display location trajectory diagram that corresponds to the user identifier, wherein an order in which the user historically browses two or more of the plurality of display locations is recorded in the display location trajectory diagram;
   determining a target display location of the plurality of display locations based on the display location trajectory diagram, the target display location being associated with the source display location and being non-contiguous with the source display location in the graphical user interface, wherein the target display location is a predicted location that is likely to be browsed by the user and is not concurrently displayed with the source display location;
   identifying a user preference diagram that (i) corresponds to the user identifier and (ii) indicates information types in each display location historically tapped by the user;
   identifying one or more information types for the target display location based on querying the user preference diagram;
   determining an information type of a highest priority as information to be sent;
   retrieving, from an information base, target information of the information type with the highest priority that corresponds to the target display location by skipping neighboring information corresponding to all neighboring locations that are between the target display location and the source display location on the graphical user interface;
   transmitting the target information to the client device that corresponds to the user identifier for display in the target display location; and
   displaying, on the client device, the transmitted target information in the target display location.

2. The computer-implemented method of claim 1, wherein the display location trajectory diagram includes display location data uploaded by the client device and representing display locations historically browsed by the user, wherein the display location data comprises a user identifier, display location identifiers, and a timestamp, and wherein display locations that correspond to the display location identifiers in the display location data are associated with the user identifier in the display location data in order of the timestamp.

3. The computer-implemented method of claim 1, wherein identifying the display location trajectory diagram comprises:
   identifying the display location trajectory diagram for a target display location associated with the source display location and after the source display location;
   determining that there is more than one target display location;
   in response to determining that there is more than one target display location, retrieving a priority of each target display location; and
   determining a target display location with a highest priority as a final target display location.

4. The computer-implemented method of claim 3, wherein the priority of each of the target display locations is based on a number of times the user has browsed each of the target display locations.

5. The computer-implemented method of claim 1, wherein transmitting the target information to the client device that corresponds to the user identifier for display in the target display location comprises:
   pushing information of an identified information type to the target display location in the client device that corresponds to the user identifier.

6. The computer-implemented method of claim 1, wherein the user preference diagram comprises information data uploaded by the client device historically tapped by the user, wherein the information data comprises a user identifier, a display location identifier, and an information type, wherein the user preference diagram associates the display location identifier with the information type in the information data with the user identifier in the information data.

7. The computer-implemented method of claim 1, wherein querying the user preference diagram comprises:

determining whether the target display location is not identified in the user preference diagram based on the target display location; and in response to determining that the target display location is not identified in the user preference diagram based on the target display location, randomly determining an information type as the information type that corresponds to the target display location.

8. The computer-implemented method of claim 5, wherein pushing information of the identified information type to the target display location in the client device that corresponds to the user identifier comprises:

determining that there is more than one target display location;

in response to determining that there is more than one target display location, retrieving a priority of each information type;

determining information of an information type with a highest priority as information to be sent; and pushing the information to be sent to the more than one target display location in the client device that corresponds to the user identifier.

9. The computer-implemented method of claim 8, wherein the priority of each information type is determined based on a number of uploads associated with each information type.

10. A non-transitory, computer-readable medium storing one or more instructions executable by a computer system to perform operations comprising:

determining a direction of scrolling for a graphical user interface of a client device, the graphical user interface having a plurality of display locations arranged in an order, wherein each display location of the plurality of display locations occupies a corresponding position in the graphical user interface;

determining a source display location of the plurality of display locations as a most recent display location to enter a display area of the client device in accordance with the direction of scrolling;

receiving an information acquisition request sent by the client device, wherein the information acquisition request comprises an identifier of the source display location of the plurality of display locations and a user identifier of a user that requests to obtain information;

identifying a display location trajectory diagram that corresponds to the user identifier, wherein an order in which the user historically browses two or more of the plurality of display locations is recorded in the display location trajectory diagram;

determining a target display location of the plurality of display locations based on the display location trajectory diagram, the target display location being associated with the source display location and being non-contiguous with the source display location in the graphical user interface, wherein the target display location is a predicted location that is likely to be browsed by the user and is not concurrently displayed with the source display location;

identifying a user preference diagram that (i) corresponds to the user identifier and (ii) indicates information types in each display location historically tapped by the user;

identifying one or more information types for the target display location based on querying the user preference diagram;

determining an information type of a highest priority as information to be sent;

retrieving, from an information base, target information of the information type with the highest priority that corresponds to the target display location by skipping neighboring information corresponding to all neighboring locations that are between the target display location and the source display location on the graphical user interface;

transmitting the target information to the client device that corresponds to the user identifier for display in the target display location; and displaying, on the client device, the transmitted target information in the target display location.

11. The non-transitory, computer-readable medium of claim 10, wherein the display location trajectory diagram includes display location data uploaded by the client device and representing display locations historically browsed by the user, wherein the display location data comprises a user identifier, display location identifiers, and a timestamp, and wherein display locations that correspond to the display location identifiers in the display location data are associated with the user identifier in the display location data in order of the timestamp.

12. The non-transitory, computer-readable medium of claim 10, wherein identifying the display location trajectory diagram comprises:

identifying the display location trajectory diagram for a target display location associated with the source display location and after the source display location;

determining that there is more than one target display location;

in response to determining that there is more than one target display location, retrieving a priority of each target display location; and determining a target display location with a highest priority as a final target display location.

13. The non-transitory, computer-readable medium of claim 12, wherein the priority of each of the target display locations is based on a number of times the user has browsed each of the target display locations.

14. The non-transitory, computer-readable medium of claim 10, wherein transmitting the target information to the client device that corresponds to the user identifier for display in the target display location comprises:

pushing information of an identified information type to the target display location in the client device that corresponds to the user identifier.

15. The non-transitory, computer-readable medium of claim 10, wherein the user preference diagram comprises information data uploaded by the client device historically tapped by the user, wherein the information data comprises a user identifier, a display location identifier, and an information type, wherein the user preference diagram associates the display location identifier with the information type in the information data with the user identifier in the information data.

16. The non-transitory, computer-readable medium of claim 10, wherein querying the user preference diagram comprises:

determining whether the target display location is not identified in the user preference diagram based on the target display location; and in response to determining that the target display location is not identified in the user preference diagram based on the target display location, randomly determining an information type as the information type that corresponds to the target display location.

17. The non-transitory, computer-readable medium of claim 14, wherein pushing information of the identified information type to the target display location in the client device that corresponds to the user identifier comprises:
- determining that there is more than one target display location;
- in response to determining that there is more than one target display location, retrieving a priority of each information type;
- determining information of an information type with a highest priority as information to be sent; and
- pushing the information to be sent to the more than one target display location in the client device that corresponds to the user identifier.

18. A computer-implemented system, comprising:
- one or more computers; and one or more computer memory devices interoperably coupled with the one or more computers and having tangible, non-transitory, machine-readable media storing one or more instructions that, when executed by the one or more computers, perform one or more operations comprising:
- determining a direction of scrolling for a graphical user interface of a client device, the graphical user interface having a plurality of display locations arranged in an order, wherein each display location of the plurality of display locations occupies a corresponding position in the graphical user interface;
- determining a source display location of the plurality of display locations as a most recent display location to enter a display area of the client device in accordance with the direction of scrolling;
- receiving an information acquisition request sent by the client device, wherein the information acquisition request comprises an identifier of the source display location of the plurality of display locations and a user identifier of a user that requests to obtain information;
- identifying a display location trajectory diagram that corresponds to the user identifier, wherein an order in which the user historically browses two or more of the plurality of display locations is recorded in the display location trajectory diagram;
- determining a target display location of the plurality of display locations based on the display location trajectory diagram, the target display location being associated with the source display location and being non-contiguous with the source display location in the graphical user interface, wherein the target display location is a predicted location that is likely to be browsed by the user and is not concurrently displayed with the source display location;
- identifying a user preference diagram that (i) corresponds to the user identifier, and (ii) indicates information types in each display location historically tapped by the user;
- identifying one or more information types for the target display location based on querying the user preference diagram;
- determining an information type of a highest priority as information to be sent;
- retrieving, from an information base, target information of the information type with the highest priority that corresponds to the target display location by skipping neighboring information corresponding to all neighboring locations that are between the target display location and the source display location on the graphical user interface;
- transmitting the target information to the client device that corresponds to the user identifier for display in the target display location; and
- displaying, on the client device, the transmitted target information in the target display location.

* * * * *

UNITED STATES PATENT AND TRADEMARK OFFICE
CERTIFICATE OF CORRECTION

| | |
|---|---|
| PATENT NO. | : 11,182,065 B2 |
| APPLICATION NO. | : 16/378213 |
| DATED | : November 23, 2021 |
| INVENTOR(S) | : Renen Sun |

It is certified that error appears in the above-identified patent and that said Letters Patent is hereby corrected as shown below:

In the Claims

Column 26, Line 16, in Claim 18, delete "identifier," and insert -- identifier --, therefor.

Signed and Sealed this
Nineteenth Day of April, 2022

Katherine Kelly Vidal
*Director of the United States Patent and Trademark Office*